US006667736B1

(12) United States Patent
Bhansali et al.

(10) Patent No.: US 6,667,736 B1
(45) Date of Patent: Dec. 23, 2003

(54) METHOD FOR COMMUNICATING LOCAL INFORMATION BETWEEN COMPONENT OBJECTS AND HOSTS

(75) Inventors: Anil Bhansali, Newcastle, WA (US); Brian D. Wentz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/099,235

(22) Filed: Jun. 17, 1998

(51) Int. Cl.$^7$ ................................................ G09G 5/00
(52) U.S. Cl. ............................. 345/171; 707/3; 717/137
(58) Field of Search .............................. 709/316, 315, 709/100–108, 203, 218; 707/536, 1–10; 345/171, 968, 703; 717/137; 704/8, 277; 434/156, 157

(56) References Cited

U.S. PATENT DOCUMENTS

| | | | |
|---|---|---|---|
| 5,251,130 A | * 10/1993 | Andrews et al. | ................ 704/3 |
| 5,440,744 A | * 8/1995 | Jacobson et al. | ........... 709/203 |
| 5,546,304 A | * 8/1996 | Marschner et al. | ............ 704/4 |
| 5,634,070 A | * 5/1997 | Robinson | ..................... 712/28 |
| 5,774,721 A | * 6/1998 | Robinson | .................... 709/303 |
| 5,917,484 A | * 6/1999 | Mullaney | .................... 345/703 |
| 5,944,790 A | * 8/1999 | Levy | ........................... 709/218 |
| 5,974,372 A | * 10/1999 | Barnes et al. | ................ 345/703 |
| 5,995,920 A | * 11/1999 | Carbonell et al. | .............. 704/9 |
| 6,119,079 A | * 9/2000 | Wang et al. | .................... 704/8 |
| 6,163,785 A | * 12/2000 | Carbonell et al. | .......... 707/530 |
| 6,185,729 B1 | * 2/2001 | Watanabe et al. | ........... 717/100 |

* cited by examiner

Primary Examiner—John Follansbee
Assistant Examiner—V. H. Nguyen
(74) Attorney, Agent, or Firm—Merchant & Gould, LLC (57) ABSTRACT

Communicating local information, such as a user interface language, between a host application and a software component. In response to a user's request, the host application invokes the software component to perform a task addressing the user's request, such as generating user interface message. In order to determine the appropriate language for the user interface message, the software component queries the host application to identify the user and to return the user interface language requirements for the user. In the case where the host application is an end-user application, the host returns the current user interface language as the user interface language requirement. When the host application is a server application using a multi-threaded environment, the host application returns the user interface language of the currently running thread at the time of the query. If the host application is not an end-user application or does not use a multi-threaded architecture, the software component provides contextual information in a parameter of the query to aid the host application in determining the user interface language requirements. In the event that the software component does not receive user interface requirements from the host application, the software component follows a priority scheme to determine the user interface language.

25 Claims, 5 Drawing Sheets

METHOD FOR COMMUNICATING LOCAL INFORMATION BETWEEN COMPONENT OBJECTS AND HOSTS

FIELD OF INVENTION

The invention relates to the communication between component objects and host applications, and particularly to a shared component object determining the language of a user interface message by interacting with the host application.

BACKGROUND OF THE INVENTION

Software vendors are increasingly trying to market their products overseas to take advantage of foreign markets. As expected, foreign markets require that the user interface be presented using local information, specifically a local language, designed for the particular foreign market. For example, users in Japan desire to see user interfaces incorporating the Japanese languages. For some applications, it is possible to install one language set and have the application use this language set for all users that access the application. However some applications are more complex and involve many users and possibly requiring different language interfaces.

Applications that service one or more users may take advantage of shared software components to perform tasks. For example, an application program may service only a single user, but include a shared software component used by multiple applications in different languages. A shared software component is a module that performs a specific task, and can be invoked in response to a request from a user using the same or different applications. When an application services several users and uses a shared software component, the shared software component may be required to generate user interface messages, i.e., information to be sent to the user, in different languages depending on the language of the user making the request. This creates a need for the shared software component to determine the language of a particular user that generates a request invoking the shared software component.

The solution to the above need is not trivial. When the shared software component is created indirectly from a function called by the host application, there is no opportunity to exchange user interface language information with the host application. The software component must first obtain the user interface language requirements, however, prior to responding to the user request.

There have been attempts to address the need for a shared software component to determine the language of a user interface message based on a user request. Previously, applications have addressed this need by making assumptions about the user interface language. These assumptions include selecting the user interface language of the operating system or of the installed application as the language of the user interface message. However, in a shared environment, these assumptions may be incorrect because several users using the shared software component may require the user interface messages in different languages. For example, if the operating system installs one language and the application installs another language, then one will present a user interface message in the wrong language.

Another prior solution is adding a parameter to all interfaces that comprise the user interface language. While this works well with the applications and shared software components that are designed to use this additional parameter, previously developed software components that do not use this additional parameter cannot take advantage of this solution. Furthermore, many prior shared software components are immutable and used in hundreds of existing applications. Consequently, there is a vast array of existing software components for which this solution does not apply.

Therefore, there exists a need to provide a method for communicating between a host application and a shared software component, wherein new and existing shared software components can determine the language of a user interface message without modification to incorporate another parameter.

SUMMARY OF THE INVENTION

The present invention meets the needs described above by providing a method for communicating between a host program and a shared software component that allows both new and existing shared software components to determine the language of a user interface message. While the present invention supports requests received from several applications, for simplicity, it will be described in terms of requests from multiple users using one application. In addition, the host program may include those programs such as a host application that runs under an operating system, the operating system itself or any other type of program module that can be executed on a computer system. Again, for simplicity, the present invention will be described in terms of a host application. Generally described, the present invention provides a method wherein a function call that is accessible to the host application and the shared software component is utilized to pass the language information stored at the host application to the software component. In the event that the shared software component, or the host application, cannot determine the language of the user, the shared software component follows a priority system to determine the language of the user interface message.

The advantage of using a function call accessible to the host application and the shared software component is that no modification to the existing host application or shared software component to support a new function is required. This is particularly advantageous when dealing with existing shared software components. In addition, using a priority system for the shared software component to follow, in the event the language of the user interface message cannot be determined from the host application, provides for a well-defined and predictable determination of the language of the user interface message.

The present invention incorporates a host application, users and a shared software component. The shared software component is invoked by the host application to perform a specific task for the user. Multiple users may desire the specific task performed by the shared software component. When multiple users request this specific task from the host application, the shared software component can be used to perform this specific task for the multiple users, thereby being shared among them. When multiple users require this specific task, but have different user interface languages in which to receive information generated by the shared software component, the present invention provides a method for the shared software component to determine the language of a specific user and to generate a user interface message in the language desired by that user.

The host application receives a request from a user. In response to the user's request, a host application invokes a shared software component to perform a task addressing the user's request. This task typically includes generating a user interface message. To determine the appropriate language for the user interface message, the shared software component queries the host application to identify the user and to return the user interface language requirements for the user. In the case where the host application is an end-user application, the host returns the current user interface language as the user interface language requirement. If the host application is a server application using a multi-threaded environment, the host application returns the user interface language of the currently running thread at the time of the query. If the host application is not an end-user application or does not use a multi-threaded architecture, the software component provides contextual information in a parameter of the query to aid the host application in determining the user interface language requirements.

In the event that the host application does not support the query function from the shared software component, or the shared software component cannot determine the user interface language from the information provided by the host application, the software component follows a priority system to determine the user interface language. The shared software component first locates the host application's executable file to access the local information stored in that executable file. If the software component cannot determine the user interface language from the local information, the software component then looks to the user interface language currently selected for the operating system. This will be checked when the operating system supports a user input language definition that is separate from the user interface language definition for the operating system. If the software component cannot determine the user interface requirements from the user interface language currently selected for the operating system or separate language definitions are not supported, the software component will use the currently installed language for the operating system.

After receiving the user interface language requirements from the host application or from the priority system, the shared software component generates the user interface message based on the language defined in the user interface language requirements.

These and other aspects of the present invention may be more clearly understood and appreciated from a review of the following detailed description of the disclosed embodiments and by reference to the appended drawings and claims.

DETAILED DESCRIPTION OF EXEMPLARY EMBODIMENTS

The present invention provides a method for determining the language of a user interface when invoking a shared software component by a host application. In one embodiment, the invention is incorporated into a suite of applications bundled together and entitled "OFFICE 9", marketed by Microsoft Corporation of Redmond, Wash. Briefly described, the "OFFICE 9" suite allows multiple users access to multiple applications and provides a clean and consistent interface between the various applications. The applications within the "OFFICE 9" suite, and even those created outside of these applications, can share component software programs to process similar tasks.

The present invention supports communication between a host program and a shared software component, wherein new and existing shared software components can determine the language of a user interface message without relying upon the addition of a new language related parameter. The host application receives a request from a user and invokes a software component in response to the user's request. The software component then queries the host application to identify the user that made the request. The host application receives the query and identifies which user made the request. After identifying the user that made the request, the host application retrieves state data information for the identified user and provides this information to the software component. Once the software component receives the state data information, it determines the user interface language requirements and generates a user interface message using the determined user interface language requirements.

In the event that the host application does not support the query function from the shared software component, or the shared software component cannot determine the user interface language from the information provided by the host application, the software component follows a priority system to determine the user interface language. The shared software component first locates the host application's executable file to access the local information stored in that executable file. If the software component cannot determine the user interface language from the local information, the software component then looks to the user interface language currently selected for the operating system. This will be checked when the operating system supports a user input language definition that is separate from the user interface language definition for the operating system. If the software component cannot determine the user interface requirements from the user interface language currently selected for the operating system or separate language definitions are not supported, the software component will use the currently installed language requirement for the operating system.

Figure 1:
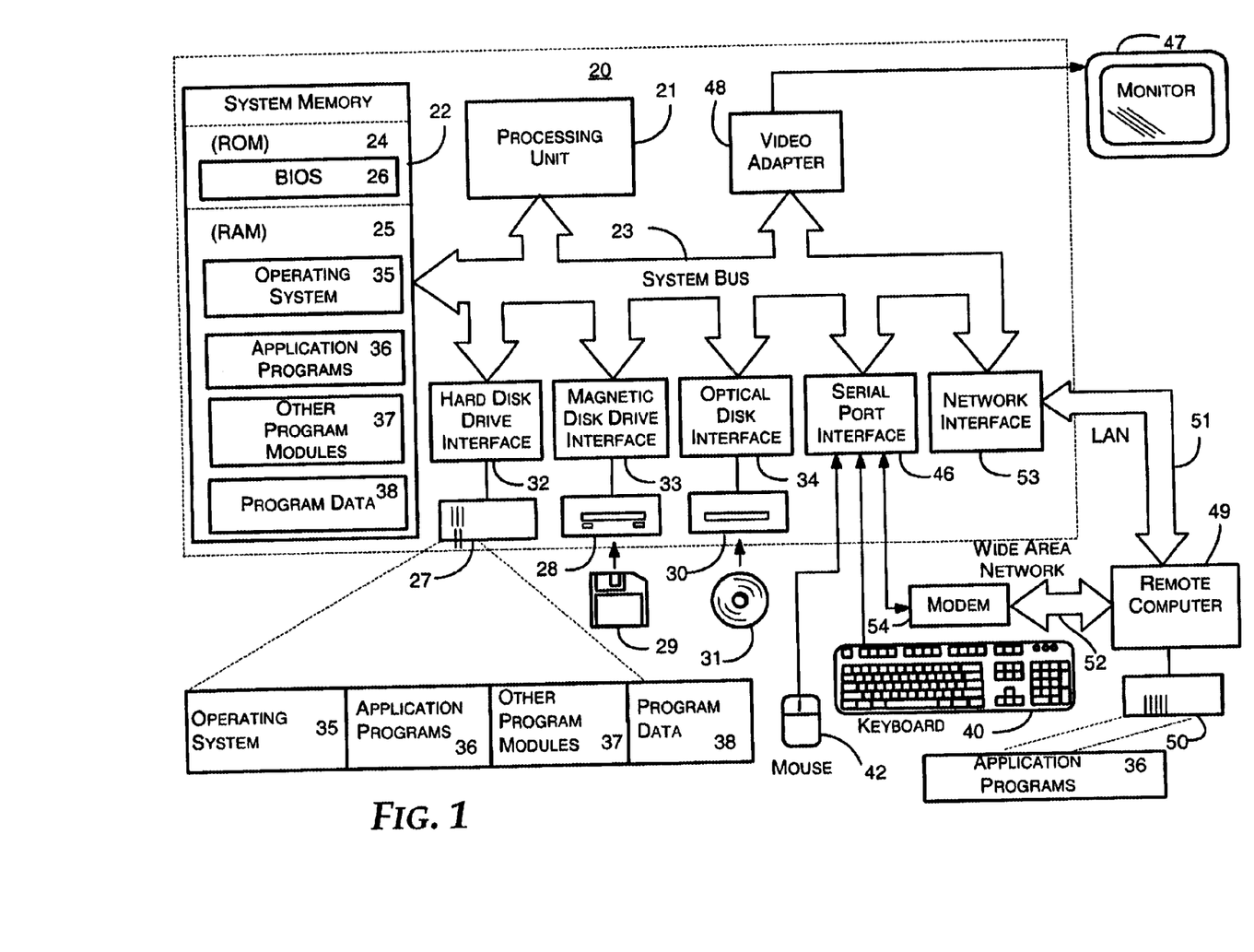
FIG. 1 is a block diagram of the operating environment for an exemplary embodiment of the invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, which may include a shared software component, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
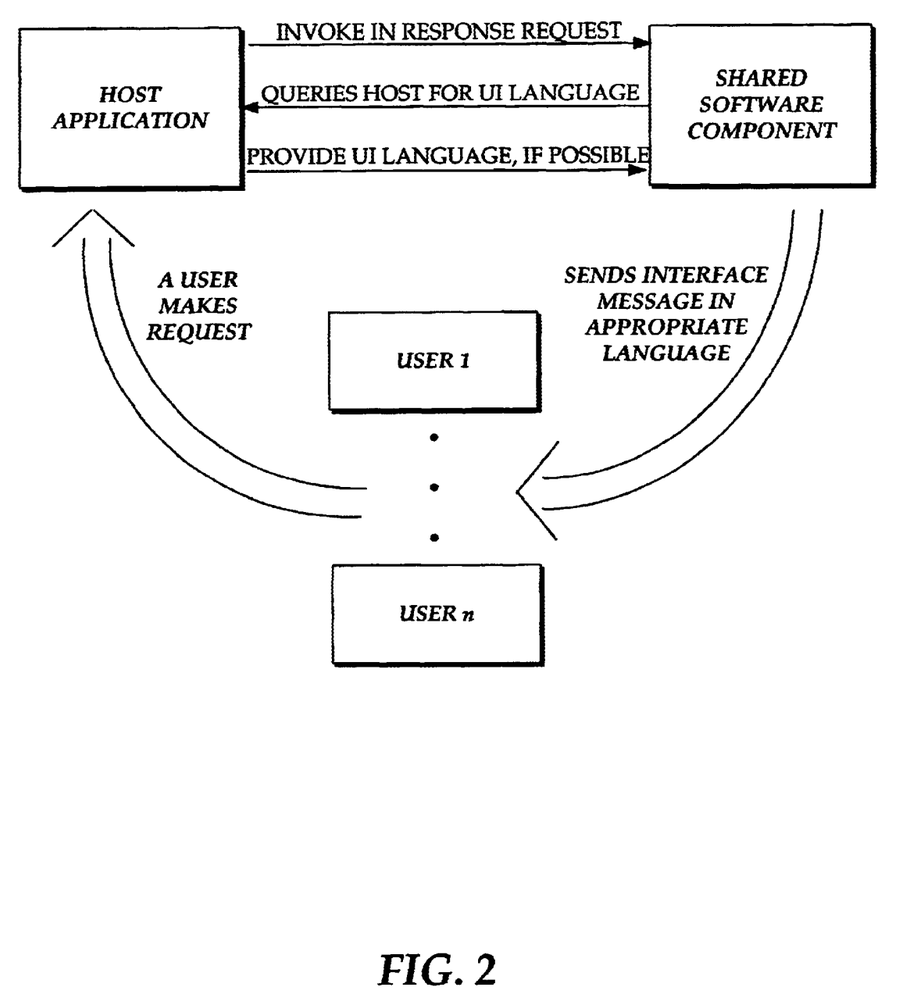
FIG. 2 is a block diagram illustrating the interaction between a host application, a software component and multiple users in accordance with an exemplary embodiment of the present invention.

FIG. 2 is a block diagram illustrating the interaction between a host application, a shared software component and multiple users in accordance with an exemplary embodiment of the present invention. Users 210–215 make requests to the host application 200 for a specific task requiring the user to receive information via a user interface message. A user interface message is information that is generated by a software component 205 and presented to a user. The request from users 210–215 can be any request to perform some task which requires the issuance of a user interface message. The requests are also similar, or the same, so that they require the host application 200 to invoke the same software component 205. While this diagram depicts the request coming from a user, those skilled in the art will recognize that the request may be made by multiple applications or by a combination of users and applications. It is key, though, that the request induces the host application to invoke one software component to respond to the requests. In this manner, the software component 205 is shared among the several users 210–215 making requests, thereby making it a shared software component. However, it is not required that the software components be shared in order for the present invention to operate. Even if only one user makes a request, the present invention provides a method for the software component to determine the user interface language requirements for that user.

The host application 200 invokes a software component 205 in response to receiving a request from one of the users 210–215. The host application 200 also accepts queries from the software component 205 regarding the user interface language requirements for the user originating the request. The host application 200, therefore, must track which users 210–215 make which request. This is generally performed by assigning an identification to each of the users 210–215. When the user request is made to the host application 200, the host application associates the identification to the request. Depending on the type of host application 200, it may also maintain information regarding the user interface language of the users 210–215 that submit requests. In these cases, it obtains this information when the user establishes a connection to the host application 200. The connection may be established when the user executes the host application to be run on its local processor. However, it will be recognized that this may also be done when the user signs on to a multi-user environment where the host application controls multiple user sessions. In this case, the host application can retrieve the user interface language requirements by accessing a file containing preferences, such as the user's language requirements, at sign on.

If the host application 200 can determine the user interface language requirements for a specific request, it sends this information to the software component in response to a query. When queried, the host application 200 will provide the user interface language requirement to the software component 205 for a specific user submitting a request to the host application.

The complexity of the tasks conducted by the host application 200 to determine the user interface language requirement can vary with the type of host application 200. In the simplest case, the host application is an end-user application. In this case, the host returns the current user interface language as the user interface language requirement. A more complex case occurs when the host application is a server application using a multi-threaded environment. In this case, the host application returns the user interface language of the currently running thread at the time of the query. Finally, the most complex case is where the host application is not an end-user application or does not use a multi-threaded architecture. In this most complex case, the software component provides contextual information in a parameter of the query to aid the host application in determining the user interface language requirements.

The host application 200, however, cannot always relay the users interface language requirement to the users 210–215. For example, the host application 200 may not support the query used by the shared software component 205 to receive the user interface language requirements. In these cases, the software component must determine the user interface language without the help of the host application 200.

The shared software component 205 is created in response to a request from a user 210–215 to the host application 200. Shared software components 205 can perform a multitude of tasks. With respect to an exemplary embodiment, shared software components 205 generate user interface messages for the user 210–215. A user interface message is user specific and contains information to be presented to the user. While the content may apply to several users equally, the language that the user interface message is written may vary from user to user. A user interface message, while containing the same information for two users, can be generated differently for users having different language requirements. For example, a French user and a Japanese user will want the messages they receive to be in their particular language even though the substantive content of the messages are the same.

Software components 205 are task-oriented and therefore may be shared by several users to perform the same tasks. For example, a software component may function to present a printer dialogue box to the user to enter in specific print commands. Because this task is needed for multiple users that use the application, it is more efficient to use the same software component to perform the same software task for each of the users rather than use a separate software component for each user. In addition, several different applications may also want to use a software component that presents a printer dialogue box to the user to enter print commands. Similarly, it is more efficient that the multiple applications use the same software component to perform this task versus having each application develop its own.

For efficient operation, the software component 205 determines the user interface language of each of the users to determine which language to generate each of the messages in. For example, the shared software component 205 can query the host application 200 that originally invoked the shared software component 205. In response to this query, the host application 200 provides user interface language information if available. If the host application 200 maintains user interface language information relative to a specific user 210–215, then the shared software component 205 uses the supplied information to generate a user interface message for the specific user. If, however, the host application does not maintain user interface language information, then the shared software component 205 generates the user interface message without the aid of the host application 200.

After the software component 205 generates the user interface message in the language of the user that made the request, the user interface message is sent to the user. While FIG. 2 depicts the shared software component sending the user interface message to the users, it will be recognized by those skilled in the art that the shared software component 205 does not have to send the message directly to the user. The shared software component 205 may generate the message and send it to the host application 200, thereby enabling the host application to send the message to the user. In addition, the host application 200 may invoke a shared software component 205 that has no user interface task. The shared software component then invokes a second shared software component that does involve a user interface task. When the second software component is invoked, it handles all the interactions with the users 210–215 and the host application 200 instead of the first shared software component invoked.

Figure 3:
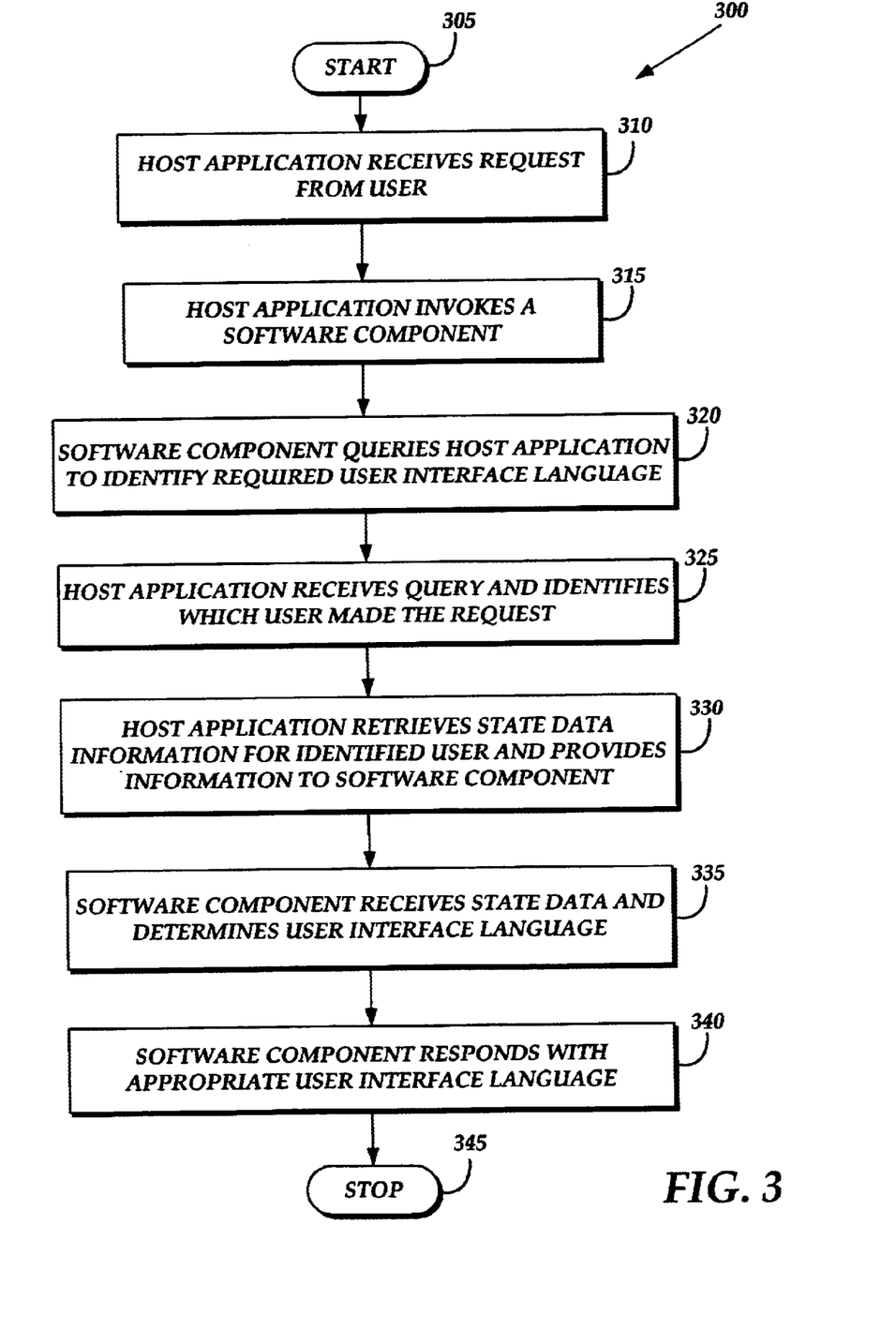
FIG. 3 is a flowchart illustrating the steps completed by a shared software component for determining the interface language for a user based on communication with a host application in accordance with an exemplary embodiment of the invention.

FIG. 3 is a flowchart illustrating the steps completed by a shared software component for determining the interface language for a user based on communications between the software component and a host application in accordance with an exemplary embodiment of the invention. As described above, when a software component is used by one or more users, or applications, it is a shared software component. The method described herein ensures that, even though several users may require the tasks associated with a software component, each user will receive a user interface message in the appropriate language for that user.

Method 300 begins with the START step 305. Proceeding to step 310, the host application receives a request from the user. As previously stated, the request identifies a need for presenting user interface information to the user. User interface information can be in the form of a dialogue box, menus, buttons or other user interface mechanisms. The host application, if it has not already done so, assigns an identification to the user and then associates the request with the user. This identification allows the host application to respond to any queries regarding the user or the request that the user has submitted.

In step 310, the host application invokes a software component to perform a task associated with the request. While the host application invokes the software component, it should be recognized by those skilled in the art that this may be performed in many ways. In the case where the software component is programmed in an object oriented language, the host application will create an instance of the software component to perform the task. It is in this manner that the software component may be shared among many users and or processes.

In step 320, the software component queries the server to identify the required user interface language. Not all software components invoked will require this query, only those that are required to generate a user interface message. Even different instances of the same software component may or may not require this query. Depending on the request, one instance of a software component may be required to generate a user interface message, and in another instance, a user interface message will not be generated. Only those instances where a software component is required to generate a user interface message in response to a specific user request will the software component be required to query the host application for the user's language requirements.

Furthermore, the software component queries the server prior to determining which language to use to generate the user interface message. This is critical because it is possible that the user interface language used in the host application may change at any time. This can occur when several users using different languages interact with the host. In addition, the software component does not store the user interface requirements for the users. Therefore, to ensure that the software component uses the correct language for the user, it queries the host whenever the user interface language is needed.

It is preferable that the query in step 320 is an existing function already supported by the host application and the software component. This prevents the need to generate new functions or reprogrammed previously used ones in the host application and the software component. It is also preferable that the software component be capable of testing for the existence of this query function. Testing for the existence of the query function will tell the software component whether the application can provide user interface language information. The software component can test for existence of the query function if it does not have sufficient information to determine whether the query is supported by the host application.

In one embodiment of the present invention, a second software component is invoked by the first software component, which was originally invoked by the host application. The first software component does not generate user interface messages, whereas the second software component does. In these cases, the second software component can query the host application to determine the user interface language based on communications between the host application and the second software component.

Proceeding to step 325, the host application receives the query and identifies which user made the request. The host application keeps the identification of users that make requests to the host application. The requests are preferably stored and associated with the identification of the user making the request. In addition, the host application can maintain other state data relative to the user. The user's language requirements for each user may also be maintained by the host application for each user. Therefore, when the host application receives the query from the software component to identify the user, the host application looks up the request and the associated identification of the user that made the request. Following the user identification, processing continues to step 330.

In step 330, the host application retrieves the state data for the identified user and provides this information to the software component. As stated above, the host application can maintain state data for each user. In many host applications, this state data may also include the user's language requirements. Therefore, when the software component receives state data from the host application, it may also receive the user's language requirements. In the event, however, that the host application does not provide the user's language requirements, the software component will still need to determine the user's language requirements.

Proceeding to step 335, the software component receives the state data information from the host application and then determines the language for the user that generated the request. For example, in the case of end-user applications, the host application returns the current user interface language that the application is running. However, for more complex host applications, the software component and the host application may conduct a negotiation to determine the user interface language. This negotiation is supported by the software component returning contextual information in a parameter that is passed along with the initial query to the host application.

However, there may also be instances where the host application may not be able to pass the user interface language requirements to the software component. In these cases, the software component determines the user interface requirements without support from the host application. In one embodiment of the present invention, the software component maintains a priority system to determine the user interface language requirements when they cannot be obtained from the host application. In this priority system, the software component first looks to a translation section of the version information in a host executable file. If the software component cannot determine the user language requirements from host executable file, it then looks to the currently selected user interface language defined in the operating system. If there is no user interface language defined in the operating system or the software component cannot determine this defined user interface language, then the software component uses the currently running language for the operating system. This priority system, utilized when information regarding user interface language requirements is not available from the host application, provides a well-defined and predictable method for choosing the user interface language for the user who initially submitted the request.

In step 340, the user interface message is generated using the user interface language requirements determined in step 340. In response to generating the user interface message by the appropriate language defined in the user interface language requirements, the software component sends this user interface message to the user. The method 300 then ends at the STOP step 345.

Figure 4:
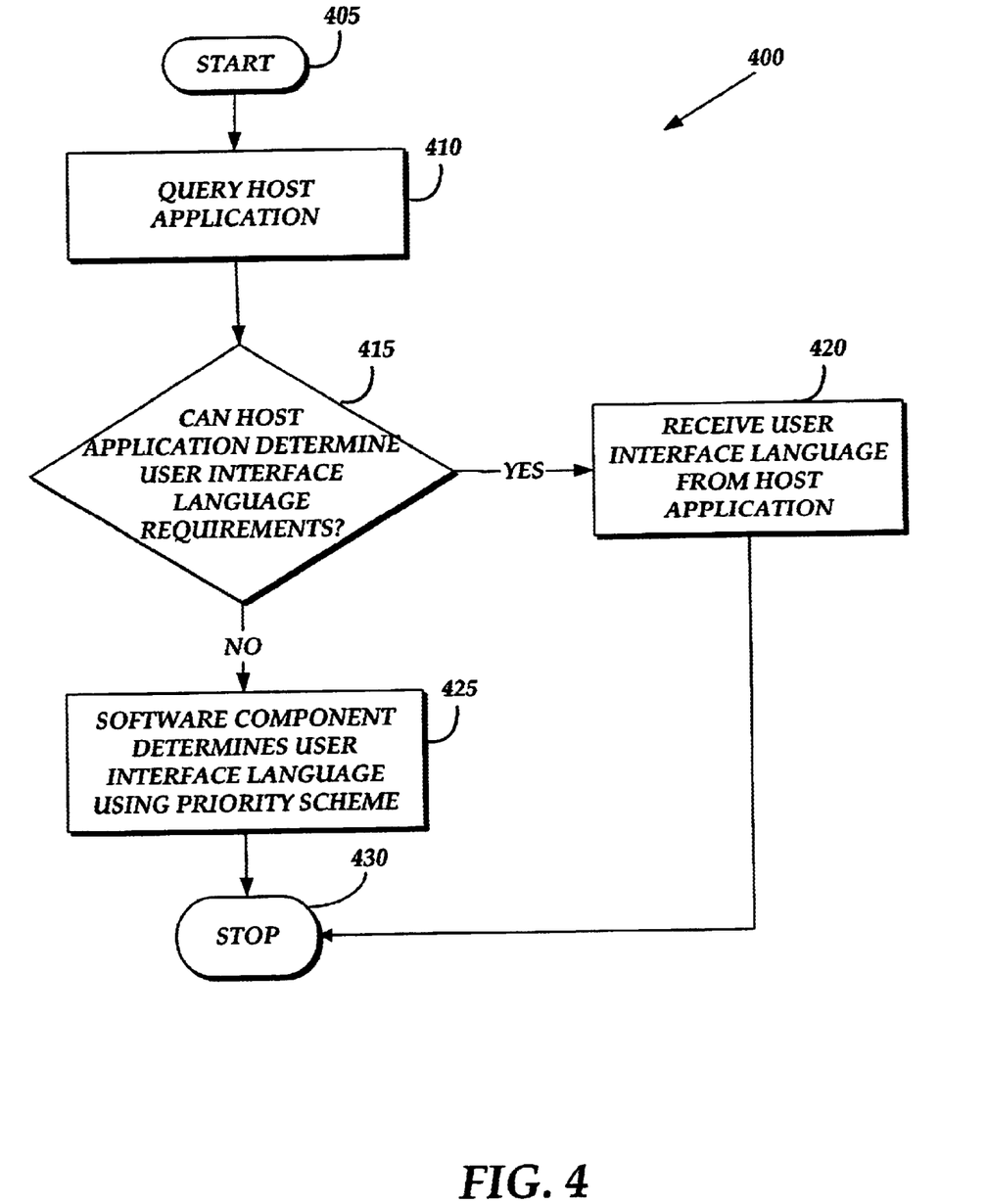
FIG. 4 is a flowchart illustrating the steps completed by a shared software component for determining the user interface language in accordance with an exemplary embodiment of the invention.

FIG. 4 is a flowchart illustrating the steps completed by the software component to determine the user interface language in accordance with an exemplary embodiment of the invention. The software component has been invoked by the host application and is required to generate a user interface message to the user. Because of the possibility that multiple users may require different user interface languages, the software component determines which language to identify in the user interface message. The software component may receive user interface language requirements from the host application or, in the event that the host cannot provide this information, choose a user interface language itself. Method 400 also provides a well-defined and predictable process for selecting a user interface language in the event the host application cannot determine the user interface language based on the contextual information supplied by the software component or if the host application does not support a query mechanism.

Method 400 begins at the START step 405 and proceeds to step 410, where the software component queries the host application to obtain the user interface language requirements used to generate the user interface message. If the software component does not know that the host application supports a query, it may test for existence of the query support in the host application prior to submitting the query. This is particularly useful in a shared environment where several applications can invoke a software component. The definition of the software component is preferably made available to other developers of host applications. However, some host applications may support selected functions that others do not (e.g., the query function described above). The failure to support all functions does not remove the functionality of the software component from the host application. For the present invention, the software component will work around the absence of selected functions in a host application to determine the user interface language requirements.

In step 415, a determination is made whether the host application can determine the user interface language requirements for the software component. If the host application supports the query mechanism and can provide the user interface language requirements, then the "Yes" branch is followed to step 420. For example, a function call from the software component to the host application can be used to test whether the host application supports the query mechanism. Examples of how the host application may provide the user interface requirements include, 1) the host application returning the user interface language that the host application is currently running, or 2) the host application returning the user interface language determined through a negotiation process between the software component and the host application.

In step 420, the software component receives the user interface language requirement from the host application. The software component can now generate a user interface message in the appropriate language in response to the user's request.

If, in step 415, the host application cannot determine the user interface language requirements, then the "No" branch is followed to step 425. In step 425, because the user interface language cannot be determined from the host application, the software component follows a priority system to choose a user interface language and generates the user interface message in response to the language chosen from the priority scheme.

The priority system involves the software component first checking the host application's executable file to inquire whether the user interface language can be determine from information available in this file. The software component will try to look-up the language supported by the user in the host application's executable file. For example, this inquiry can look for the language that the application is compiled for. In the event that the software component cannot determine the user interface language requirements in the host application's executable file, it can then check the user interface language currently selected in the operating system. This check addresses those operating systems that allow a user input language to be defined separately from the user interface language defined for the operating system. If the operating system supports this duality, then the software component can determine the user interface language requirement to be the user interface language currently selected in the operating system. The possibility that the user interface language currently selected is the same one that the user requires is relative to the number of users using the host application that require different user interface languages. Finally, if the software component cannot determine the user interface language currently selected in the operating system, then the software component can generate a user interface message in the currently installed language of the operating system. The software component generates a user interface message in the language identified by the priority system.

At step 430, method 400 ends at the STOP step.

Figure 5:
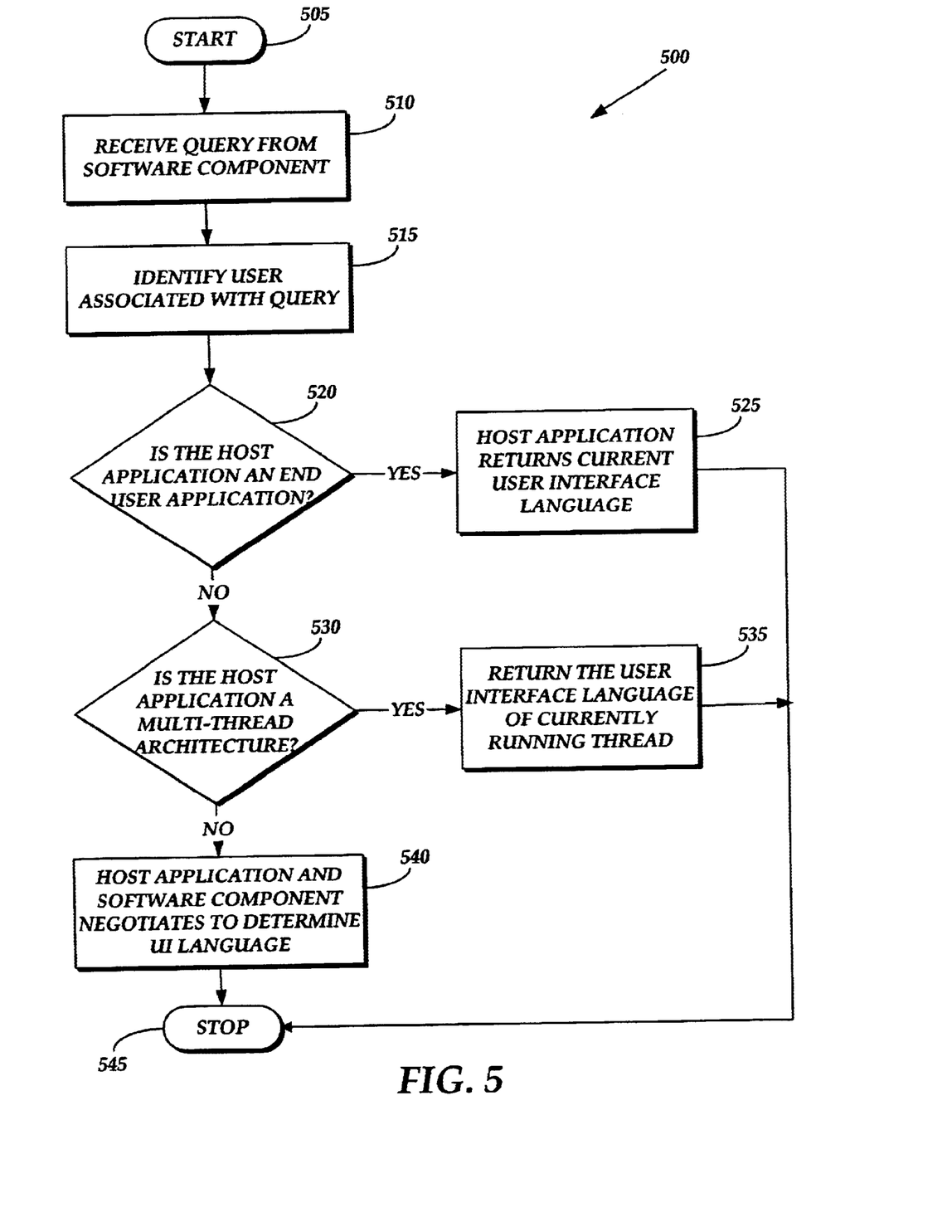
FIG. 5 is a flowchart illustrating the steps completed by the host application for determining the user interface language in accordance with an exemplary embodiment of the invention.

FIG. 5 is a flowchart illustrating the steps completed by the host application to determine the user interface language in accordance with an exemplary embodiment of the invention. For this embodiment, the software component can query the host application to determine user interface language requirements. Many host applications can maintain state data information on the user, including the user interface language requirement for that particular user. Therefore, the software component can utilize the user interface language requirements information maintained by the host application to generate user interface messages in the correct language. Depending on the host application, though, how the host determines the user interface language requirements and passes it along to the software component will vary. Method 500 describes the process by which the host application determines the user interface requirements when the host application stores this information.

Method 500 starts at step 505 with the START step. Proceeding to step 510, the host application receives a query from the software component. This query is preferably implemented as a function currently supported by both the software component and the host application. For example, one implementation of the present invention includes the "Office 9" host application developed by Microsoft Corporation. The software component query comprises the form:

LCID D11GetLCID (IBindCtx *pBC);

If the software component is not aware whether the host application supports this function, it can test for the existence of that function. If the function is not supported, the software component can determine the user interface language requirements in a different manner (see FIG. 4).

In step 515, the host application identifies the user associated with the query. As described, the host application receives the query from the software component and then searches for the user identification that made the request which prompted the invocation of the software component. The host application may be servicing several users at the same time. The host application keeps track of all the users, the requests made by the users and stores this information along with other state data information for each user. How the host application determines the user interface requirements depends on the type of host application that is running.

In step 520, a determination is made whether the host application is an end-user application. If the host application is an end-user application, then processing continues to step 525. In an end-user application, there is a one-to-one mapping of the host application to the user. Examples of end-user applications include the "WORD" word processing program and the "EXCEL" spreadsheet program both develop by Microsoft Corporation. In these cases, the software component is not going to be invoked by different users using the same application. Consequently, the user interface language requirements are known to the host application at the start-up of the host application and do not change throughout the entire session between the user and the host application.

In step 525, the host application returns the current user interface language that has been defined to the host application, along with any other state data the software component requires. After returning the current user interface language to the software component, the method 500 ends at step 545.

If the host application is not an end-user application, the method 500 proceeds to step 530. In step 530, method 500 determines whether the host application is a multi-threaded architecture. If the host application is a multi-threaded architecture, then processing continues to step 535. If the host application is not an end-user application, then it is a server host application capable of multiple simultaneous users. In a server host application environment, there is a one-to-many mapping between the application and users. However, there are different types of server host applications. How the user interface language requirements are passed back to the software component will depend on these differing types. Step 530 determines whether the host application is a multi-threaded architecture type of server host application.

In step 535, the host application returns the user interface language of the current running thread. It will be appreciated that determining the user interface requirements in the multi-threaded environment is more complex than in the end-user application environment. Unlike the end-user application, the host application having a multi-threaded architecture supports several different user interface languages during a session. However, in this case, the host application has a thread for each user where each thread processes one request at a time. Therefore, the context for the host application becomes the currently running thread. Consequently, the host application returns the user interface language requirements defined for the currently running thread to the software component. The method 500 then proceeds to step 545.

If in step 530, it is determined that the host application is a not multi-threaded architecture, then processing continues to step 540 where the host application and the software component negotiate to determine the user interface language requirements. Because the host application is not an end-user application or multi-threaded environment, determining the user interface language requirements to return to the software component is much more complex. Multiple users can be making simultaneous requests, each requiring the host application to establish a separate user interface language for each user. To help the host application determine the user interface language requirement, the software component can utilize a parameter contained in the initial query in step 510 to give the host application additional contextual information. This additional information allows the host application to determine what user interface language requirement is needed to address the users request.

Furthermore, the host application may use the parameter included in the query and return a request for more contextual information from the software component to help the host application determine the user interface requirements for the particular user request. If the host cannot return the user interface language requirements, then the software component will be required to use an alternative method to determine what language to generate the user interface. This process is addressed in FIG. 4.

After the user interface language requirements have been determined by the host application, method 500 ends at the STOP step 545.

In summary, the present invention is directed towards a method for communicating between a host application and a shared software component, wherein new and existing software components can determine the language of a user interface message without having to be modified to incorporate another parameter. In one embodiment, the host application receives a request from a user and invokes a software component in response to the user's request. The software component then queries the host application to identify the user that made the request. The host application receives the query and identifies which user made the request. After identifying the user that made the request, the host application retrieves state data information for the identified user and provides this information to the software component. Once the software component receives the state data information, it determines the user interface language requirements and generates a user interface message using the determined user interface language requirements.

In the event that the host application does not support the query function from the shared software component, or the shared software component cannot determine the user interface language from the information provided by the host application, the software component follows a priority system to determine the user interface language. The shared software component first locates the host application's executable file to access the local information stored in that executable file. If the software component cannot determine the user interface language from the local information, the software component then looks to the user interface language currently selected for the operating system. This will be checked when the operating system supports a user input language definition that is separate from the user interface language definition for the operating system. If the software component cannot determine the user interface requirements from the user interface language currently selected for the operating system or separate language definitions are not supported, the software component will use the currently installed language requirement for the operating system.

Alternative embodiments will become apparent to those skilled in the art to which the present invention pertains without departing from its spirit and scope. Accordingly, the scope of the present invention is described by the appended claims and is supported by the foregoing description.

What is claim is:

1. A method of communicating between a shared software component and a host program in a distributed processing system, wherein the shared software component is shared by multiple applications, said method comprising the steps of:

issuing, by the shared software component, a query having a parameter conveying contextual information;

in response to receiving the query by the host program, parsing the query to locate the parameter and to retrieve the contextual information;

determining a user interface language requirement based on information provided by the host program; and providing to the shared software component, by the host program, the user interface language requirements.

2. The method of claim 1, wherein the step of determining the user interface language requirement comprises identifying a user interface language of the host program.

3. The method of claim 1, wherein the distributed processing system comprises a multi-threaded architecture.

4. The method of claim 3, wherein the step of determining the user interface language requirement comprises identifying a user interface language of an active thread at the time the query is issued by the shared software component.

5. The method of claim 1, wherein the step of determining the user interface language requirement comprises initiating a negotiation process between the host program and the shared software component utilizing the parameter conveying contextual information.

6. The method of claim 1, wherein the shared software component is capable of being shared by other host programs.

7. The method of claim 1, wherein a plurality of instances of the shared software component are created for different users.

8. The method of claim 1, wherein the step of determining a user interface language requirement based on information provided by the host program comprises determining a user interface language requirement based on the absence of any information from the host program.

9. A method of providing language-independent shared software components, wherein each shared software component is shared by multiple applications, said method comprising the steps of:

exporting from a host program a query function;

invoking one of the shared software components from the host program;

in response to invoking the shared software component, issuing a query to the host program;

in response to the query, providing to the shared software component a user interface language requirement from the host program; and generating user interface messages by the shared software component based on the user interface language requirement.

10. The method of claim 9, wherein the step of providing the user interface language requirement to the shared software component comprises providing a language of the host program.

11. The method of claim 9, wherein the step of providing the user interface language requirement to the shared software component comprises providing a context parameter in the query.

12. The method of claim 11, wherein the context parameter is an active thread at the time the query is issued by the shared software component.

13. The method of claim 11, wherein the host program uses the context parameter to negotiate the user interface language requirement.

14. The method of claim 9, wherein the shared software component is invoked by another shared software component.

15. The method of claim 9, wherein a plurality of instances of the shared software component are created for different users.

16. A method of providing a user interface message from language-independent, shared software components, wherein each shared software component is shared by multiple applications, said method comprising the steps of:

receiving a first request by a host program;

responsive to receiving the first request, invoking a shared software component by the host program;

in response to being invoked by the first request, determining a user interface language requirement by the shared software component and generating the user interface message in a first language;

receiving a second request by the host program;

responsive to receiving the second request, invoking the shared software component by the host program; and in response to being invoked by the second request, determining the user interface language requirement by the shared software component and generating the user interface message in a second language.

17. The method of claim 16, wherein the first language and the second language comprise different languages.

18. The method of claim 16, wherein the steps of determining the user interface language requirement comprises receiving context information from the host program.

19. The method of claim 16, wherein the host program is running a multi-threaded architecture.

20. The method of claim 19, wherein the steps of determining the user interface language requirement comprises using the user interface language of a currently running thread in the multi-thread architecture.

21. The method of claim 16, wherein the steps of determining the user interface language requirement comprises initiating a negotiation process between the host program and the shared software component.

22. The method of claim 16, wherein the shared software component is invoked by another shared software component.

23. The method of claim 16, wherein a plurality of instances of the shared software component are created for different users.

24. A method of determining a language of a user interface message by a shared software component, wherein the shared software component is shared by multiple applications, said method comprising the steps of:

invoking the shared software component by a host program;

requesting, by the shared software component, the language of the user interface message from the host program;

in the event that the language of the user interface message cannot be determined from the host program, determining the language of the user interface message by using local information stored in an executable file of the host program;

in the event that the language of the user interface message cannot be determined from the local information, determining the language of the user interface message by using the currently selected user interface language for an operating system used by the host program; and in the event that the language of the user interface message cannot be determined from the currently selected user interface language for the operating system, determining the language of the user interface message by using the currently installed language for the operating system used by the host program.

25. The method of claim 24, wherein the step of invoking the shared software component by the host program is in response to a request from a user in a multi-user environment.

* * * * *

UNITED STATES PATENT AND TRADEMARK OFFICE
CERTIFICATE OF CORRECTION

PATENT NO. : 6,667,736 B1
DATED : December 23, 2003
INVENTOR(S) : Bhansali et al.

It is certified that error appears in the above-identified patent and that said Letters Patent is hereby corrected as shown below:

<u>Column 11,</u>
Line 33, delete "determine" and insert -- determined --.

<u>Column 14,</u>
Line 21, delete "claim" and insert -- claimed --.

Signed and Sealed this

Fifteenth Day of June, 2004

JON W. DUDAS
*Acting Director of the United States Patent and Trademark Office*